(12) United States Patent
Sarkis et al.

(10) Patent No.: US 12,256,253 B2
(45) Date of Patent: Mar. 18, 2025

(54) COMBINING COORDINATION INFORMATION

(71) Applicant: QUALCOMM Incorporated, San Diego, CA (US)

(72) Inventors: Gabi Sarkis, San Diego, CA (US); Tien Viet Nguyen, Bridgewater, NJ (US); Sudhir Kumar Baghel, Hillsborough, NJ (US); Kapil Gulati, Belle Mead, NJ (US); Seyedkianoush Hosseini, San Diego, CA (US); Wanshi Chen, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 265 days.

(21) Appl. No.: 17/230,590

(22) Filed: Apr. 14, 2021

(65) Prior Publication Data

US 2021/0345145 A1 Nov. 4, 2021

Related U.S. Application Data

(60) Provisional application No. 63/017,853, filed on Apr. 30, 2020.

(51) Int. Cl.
*H04W 24/10* (2009.01)
*H04L 5/00* (2006.01)
(Continued)

(52) U.S. Cl.
CPC .............. *H04W 24/10* (2013.01); *H04L 5/16* (2013.01); *H04W 24/08* (2013.01)

(58) Field of Classification Search
None
See application file for complete search history.

(56) References Cited

U.S. PATENT DOCUMENTS 10,779,308 B2 9/2020 Patil et al.
2017/0195995 A1* 7/2017 Zhu ................... H04W 8/005
(Continued)

FOREIGN PATENT DOCUMENTS

CN 104335514 A 2/2015
CN 110972290 A 4/2020
(Continued)

OTHER PUBLICATIONS

International Search Report and Written Opinion—PCT/US2021/027534—ISA/EPO—Aug. 18, 2021.
Taiwan Search Report—TW110113896—TIPO—Oct. 22, 2024.

*Primary Examiner* — Jeffrey M Rutkowski
*Assistant Examiner* — Ning Li
(74) *Attorney, Agent, or Firm* — QUALCOMM Incorporated

(57) ABSTRACT

Certain aspects of the present disclosure provide techniques for determining resources for sidelink communications based on coordination information. A method that may be performed by a first wireless device includes receiving, from second wireless devices, reports indicating coordination information associated with candidate resources and assigning ranks to the reports. The method also includes determining resources from the candidate resources for communicating with third wireless devices based on at least one of: at least two reports, and the ranks of the at least two reports; or at least one of the reports and sensing information, measured by the first wireless device, associated with the candidate resources, and the rank of the reports and a rank of the sensing information. The method further includes communicating with the third wireless devices via the determined resources.

29 Claims, 9 Drawing Sheets

(51) Int. Cl.
  *H04L 5/16*    (2006.01)
  *H04W 4/06*    (2009.01)
  *H04W 24/08*   (2009.01)
  *H04W 72/02*   (2009.01)
  *H04W 72/20*   (2023.01)
  *H04W 72/25*   (2023.01)
  *H04W 72/30*   (2023.01)
  *H04W 72/50*   (2023.01)
  *H04W 72/51*   (2023.01)
  *H04W 72/542*  (2023.01)
  *H04W 72/56*   (2023.01)
  *H04W 92/18*   (2009.01)

(56) References Cited

U.S. PATENT DOCUMENTS

| | | | |
|---|---|---|---|
| 2017/0280423 A1 | 9/2017 | Zhao et al. | |
| 2017/0280469 A1 | 9/2017 | Park et al. | |
| 2018/0270822 A1* | 9/2018 | Chae | H04W 72/04 |
| 2019/0150108 A1 | 5/2019 | Byun et al. | |
| 2019/0215806 A1 | 7/2019 | Chai et al. | |
| 2020/0229171 A1* | 7/2020 | Khoryaev | H04W 4/40 |
| 2021/0051525 A1* | 2/2021 | Cao | H04W 28/26 |
| 2021/0219268 A1* | 7/2021 | Li | H04W 72/20 |
| 2021/0219320 A1* | 7/2021 | Belleschi | H04W 76/14 |
| 2021/0314966 A1* | 10/2021 | Hui | H04W 72/20 |
| 2021/0337519 A1* | 10/2021 | Farag | H04L 5/0053 |
| 2021/0385804 A1* | 12/2021 | Ye | H04W 4/40 |
| 2022/0085923 A1* | 3/2022 | Ye | H04L 1/1825 |
| 2022/0116996 A1* | 4/2022 | Lee | H04L 1/1893 |
| 2022/0124679 A1* | 4/2022 | Ye | H04W 72/20 |
| 2022/0201655 A1* | 6/2022 | Kang | H04W 72/563 |
| 2022/0256553 A1* | 8/2022 | Lin | H04W 72/566 |
| 2022/0330275 A1* | 10/2022 | Dong | H04L 1/189 |
| 2022/0377748 A1* | 11/2022 | He | H04L 1/1893 |
| 2023/0028098 A1* | 1/2023 | Lin | H04W 72/0446 |
| 2023/0039093 A1* | 2/2023 | Xiang | H04W 72/0453 |
| 2023/0049307 A1* | 2/2023 | Liu | H04W 72/20 |
| 2023/0131353 A1* | 4/2023 | Miao | H04W 72/02 370/329 |
| 2023/0171738 A1* | 6/2023 | Di Girolamo | H04W 72/20 370/329 |

FOREIGN PATENT DOCUMENTS

| | | | | |
|---|---|---|---|---|
| TW | 201943303 A | | 11/2019 | |
| TW | 202010344 A | | 3/2020 | |
| WO | 2018031172 | | 2/2018 | |
| WO | WO 2020/148264 A1 | * | 1/2020 | ............ H04L 5/00 |
| WO | WO 2021/212483 | * | 4/2020 | ............ H04W 24/08 |
| WO | WO 2021/212514 A1 | * | 4/2020 | ............ H04W 72/02 |

* cited by examiner

COMBINING COORDINATION INFORMATION

CROSS-REFERENCE TO RELATED APPLICATION

The present Application for Patent claims priority to U.S. Provisional Application No. 63/017,853, filed Apr. 30, 2020, which is hereby expressly incorporated by reference herein in its entirety.

BACKGROUND

Field of the Disclosure

Aspects of the present disclosure relate to wireless communications, and more particularly, to techniques for determining resources for sidelink communications based on coordination information and/or sensing information.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

As the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include sidelink communications with desirable performance, reduced resource collisions, and/or desirable power consumption.

Certain aspects of the subject matter described in this disclosure can be implemented in a method for wireless communication by a first wireless device. The method generally includes receiving, from one or more second wireless devices, one or more reports indicating coordination information associated with candidate resources and assigning one or more ranks to the one or more reports. The method also includes determining one or more resources from the candidate resources for communicating with one or more third wireless devices based on at least one of: at least two reports from at least two of the one or more second wireless devices, and the ranks of the at least two reports; or at least one of the one or more reports and sensing information, measured by the first wireless device, associated with the candidate resources, and the rank of the at least one of the one or more reports and a rank of the sensing information. The method further includes communicating with the one or more third wireless devices via the determined one or more resources.

Certain aspects of the subject matter described in this disclosure can be implemented in an apparatus for wireless communication. The apparatus generally includes a transceiver, a memory, and a processor. The transceiver is configured to receive, from one or more first wireless devices, one or more reports indicating coordination information associated with candidate resources. The processor is coupled to the memory, and the processor and the memory being configured to: assign one or more ranks to the one or more reports, and determine one or more resources from the candidate resources for communicating with one or more second wireless devices based on at least one of: at least two reports from at least two of the one or more first wireless devices, and the ranks of the at least two reports; or at least one of the one or more reports and sensing information, measured by the apparatus, associated with the candidate resources, and the rank of the at least one of the one or more reports and a rank of the sensing information. The transceiver is further configured to communicate with the one or more second wireless devices via the determined one or more resources.

Certain aspects of the subject matter described in this disclosure can be implemented in an apparatus for wireless communication. The apparatus generally includes means for receiving, from one or more second wireless devices, one or more reports indicating coordination information associated with candidate resources; and means for assigning one or more ranks to the one or more reports. The apparatus also includes means for determining one or more resources from the candidate resources for communicating with one or more third wireless devices based on at least one of: at least two reports from at least two of the one or more second wireless devices, and the ranks of the at least two reports; or at least one of the one or more reports and sensing information, measured by the first wireless device, associated with the candidate resources, and the rank of the at least one of the one or more reports and a rank of the sensing information. The apparatus further includes means for communicating with the one or more third wireless devices via the determined one or more resources.

Certain aspects of the subject matter described in this disclosure can be implemented in computer readable medium having instructions stored thereon for receiving, from one or more second wireless devices, one or more reports indicating coordination information associated with candidate resources; assigning one or more ranks to the one or more reports; determining one or more resources from the candidate resources for communicating with one or more third wireless devices based on at least one of: at least two reports from at least two of the one or more second wireless devices, and the ranks of the at least two reports; or at least one of the one or more reports and sensing information, measured by the first wireless device, associated with the candidate resources, and the rank of the at least one of the one or more reports and a rank of the sensing information; and communicating with the one or more third wireless devices via the determined one or more resources.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
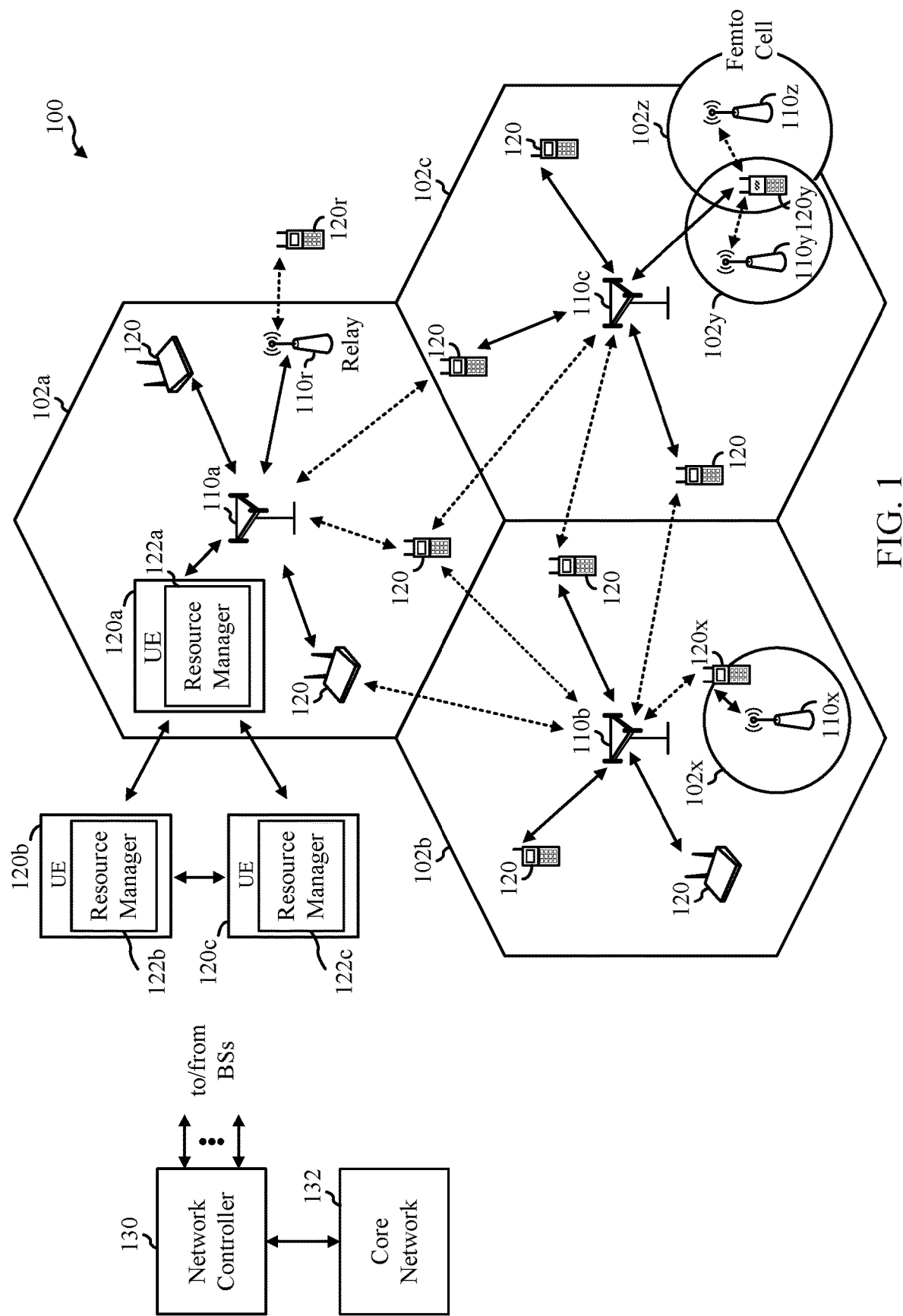
FIG. 1 is a block diagram conceptually illustrating an example wireless communication network, in accordance with certain aspects of the present disclosure.

Aspects of the present disclosure provide apparatus, methods, processing systems, and computer readable mediums for combining coordination information. In certain aspects, combining coordination information may refer to assigning one or more ranks to coordination information and prioritizing specific coordination information over other coordination information based on the ranks associated with the coordination information. Certain aspects of the present disclosure provide various techniques for combining coordination information from different sidelink sources (e.g., a wireless communication device such as a user equipment (UE), a roadside unit (RSU), or a vehicle) and/or combining coordination information with sensing information measured at a UE. Sensing information may refer to one or more measurements of signals transmitted by one or more UEs. For example, the sensing information may include reference signal received power (RSRP) measurements associated with a pool of candidate resources for sidelink communications. The techniques for combining coordination information described herein may facilitate a UE to avoid resource collisions (e.g., when two or more transmitting devices attempt to transmit on the same set of resources, such that the transmissions interfere with one another at a receiving device) with other UEs and/or provide a desirable power consumption level, in cases, where the UE relies solely on coordination information from other UEs for resource (e.g., a time-domain resource, frequency-domain resource, and/or a spatial resource) selection. In aspects, the techniques for combining coordination information described herein may enable the UE to have desirable sidelink performance (e.g., access times, latency, data rates, packet error rates, etc.) with target UE(s).

The following description provides examples of combining coordination information for sidelink communications in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

FIG. 1 illustrates an example wireless communication network 100 in which aspects of the present disclosure may be performed. For example, the wireless communication network 100 may be an NR system (e.g., a 5G NR network). According to certain aspects, the UEs 120a, 120b, 120c may be configured for combining coordination information in accordance with aspects of the present disclosure. For example, the UE 120a includes a resource manager 122a that determines resources from candidate resources for communicating with one or more other UEs (e.g., the UEs 120b, 120c) based on multiple ranked coordination information reports, or coordination information and sensing information, in accordance with aspects of the present disclosure. In aspects, the UEs 120b, 120c may also include a similar or identical resource manager 122b, 122c, respectively.

In some circumstances, two or more subordinate entities (e.g., the UEs 120a, 120b, 120c) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., the UE 120a) to another subordinate entity (e.g., the UE 120b) without relaying that communication through the scheduling entity (e.g., a UE or B S), even though the scheduling entity may be utilized for scheduling and/or control purposes. In some examples, the sidelink signals may be communicated using a licensed spectrum (unlike wireless local area networks, which typically use an unlicensed spectrum) or unlicensed spectrum.

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions, and the PSSCH may carry data transmissions. The PSFCH may carry feedback including HARQ feedback and/or channel state feedback (CSF) related to a sidelink channel quality.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. ABS may support one or multiple cells.

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

NR access may support various wireless communication services, such as enhanced mobile broadband (eMBB) targeting wide bandwidth (e.g., 80 MHz or beyond), millimeter wave (mmW) targeting high carrier frequency (e.g., e.g., 24 GHz to 53 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 2:
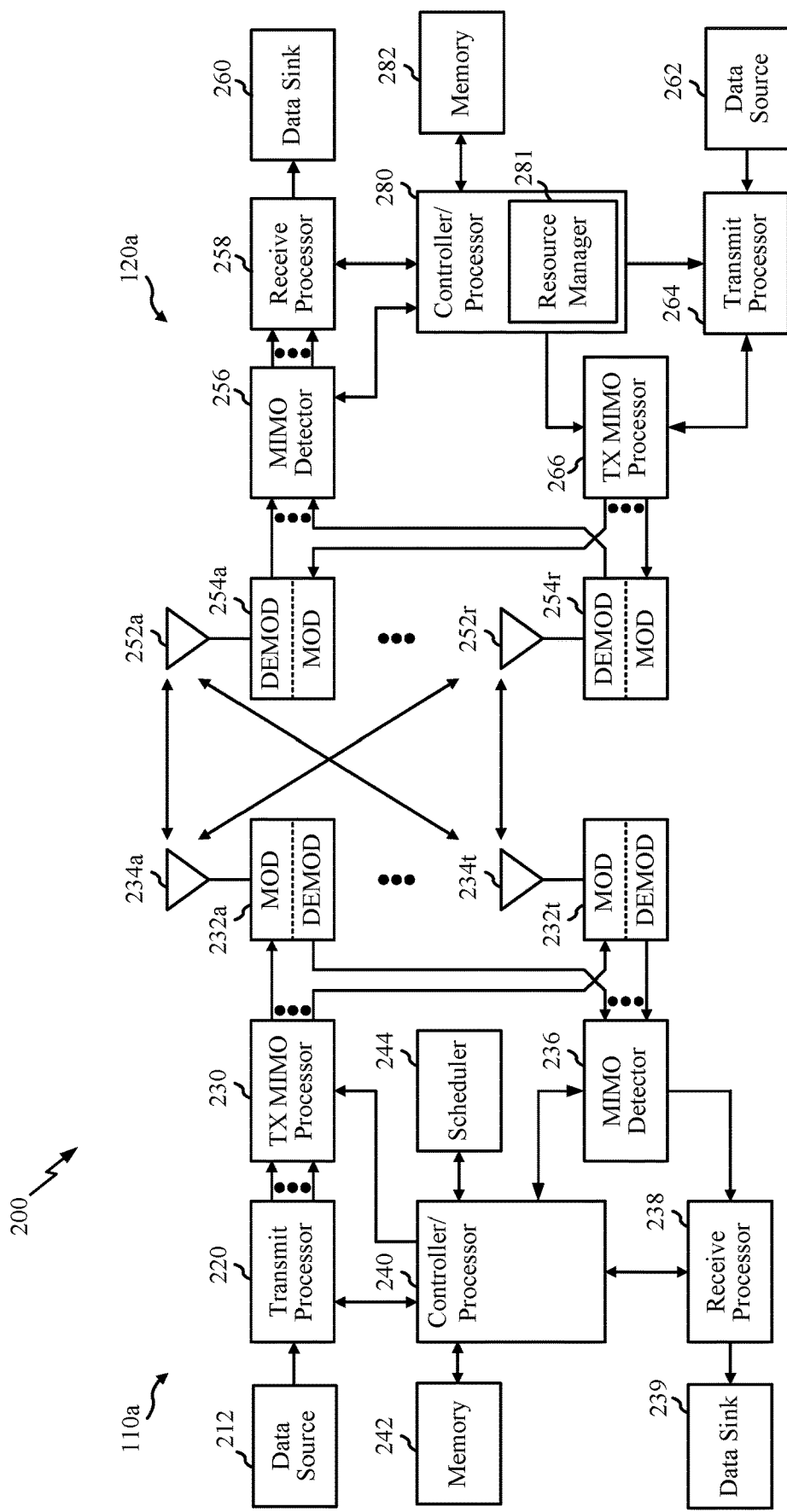
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. As shown in FIG. 2, the controller/processor 280 of the UE 120a has a resource manager 281 that determines resources from candidate resources for communicating with one or more other UEs (e.g., the UEs 120b, 120c of FIG. 1) based on multiple ranked coordination information reports, or coordination information and sensing information, according to aspects described herein. Although shown at the controller/processor, other components of the UE 120a and BS 110a may be used to perform the operations described herein.

While the example depicted in FIG. 2 is described with respect to the BS 110a communicating with the UE 120a, aspects of the present disclosure may also be applied to sidelink communications between UEs, such as between the UE 120a and UE 120b, between the UE 120a and UE 120c, or between the UE 120b and UE 120c, as depicted in FIG. 1.

Figure 3:
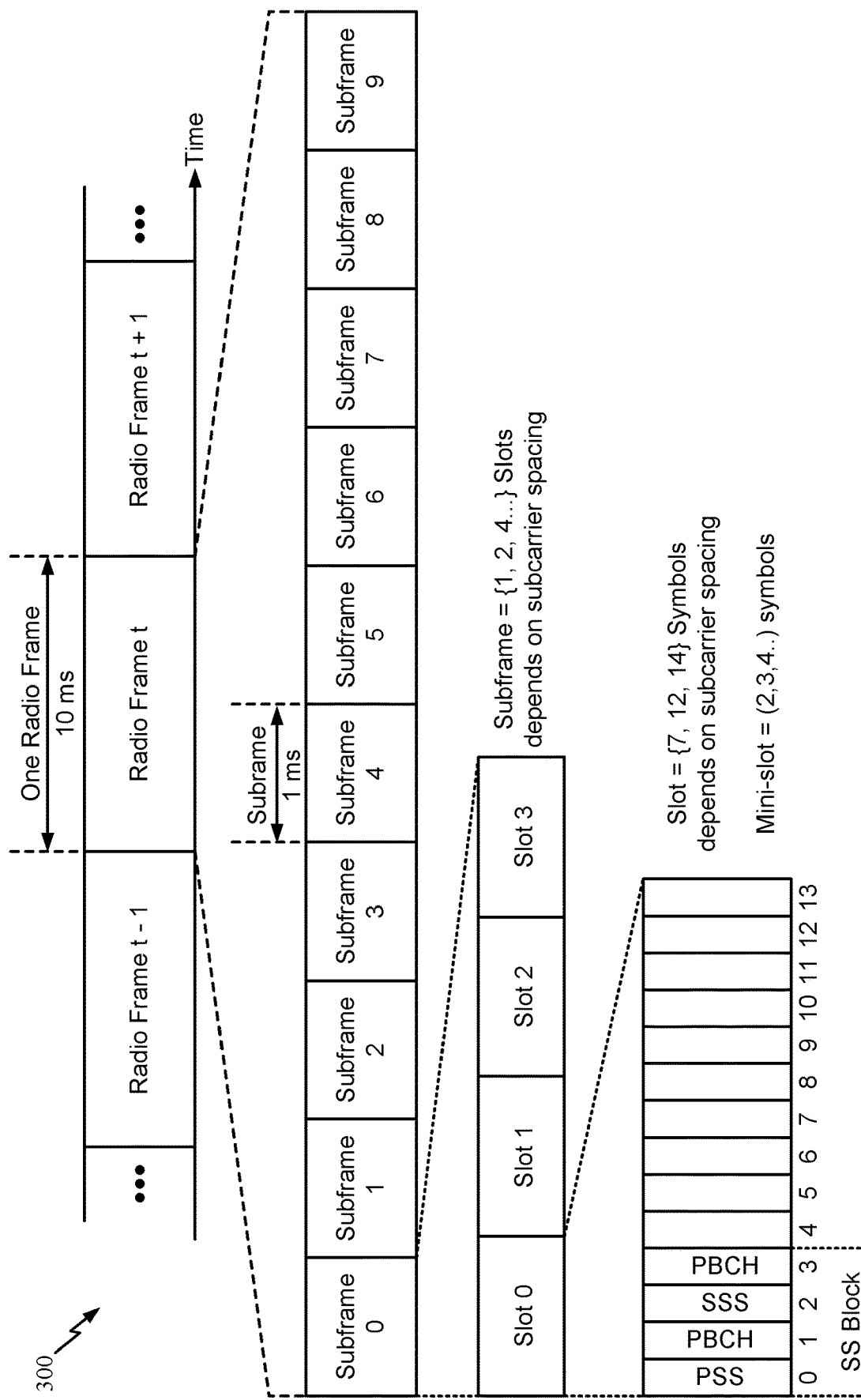
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

Figure 4:
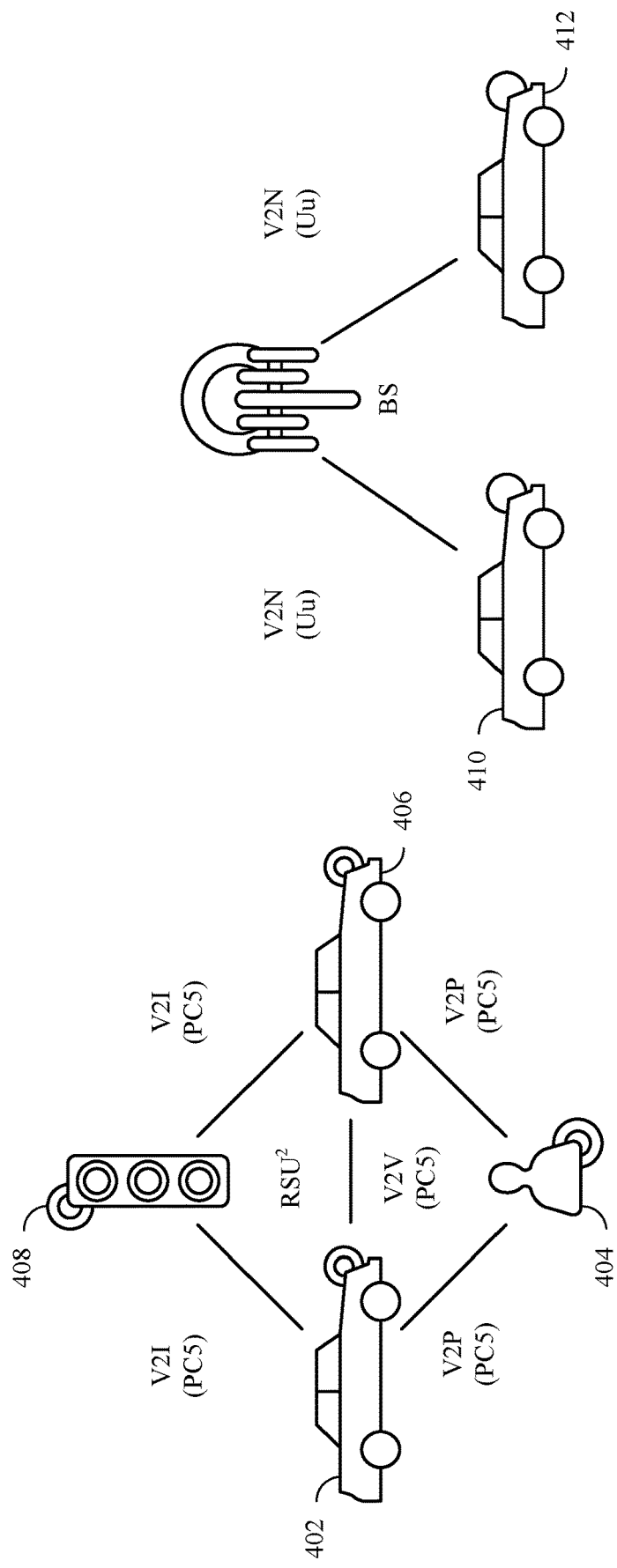
FIGS. 4A and 4B illustrate vehicle to everything (V2X) systems, in accordance with certain aspects of the present disclosure.

FIGS. 4A and 4B illustrate vehicle to everything (V2X) systems, in accordance with certain aspects of the present disclosure. The V2X systems, provided in FIGS. 4A and 4B provides two complementary transmission modes. A first transmission mode involves direct communications (e.g., also referred to herein as sidelink communications between UEs) between participants in the local area. Such communications are illustrated in FIG. 4A. A second transmission mode involves network communications through a network as illustrated in FIG. 4B, which may be implemented over a Uu interface (e.g., a wireless communication interface between a radio access network (RAN) and a UE).

Referring to FIG. 4A, a V2X system is illustrated with two vehicles. The first transmission mode allows for direct communication between different participants in a given geographic location. As illustrated, a first vehicle 402 can have a wireless communication link with an individual's UE 404 (V2P) through a PC5 interface. Communications between the first vehicle 402 and second vehicle 406 (V2V) may also occur through a PC5 interface. In a like manner, communication may occur from the first vehicle 402 to a roadside unit 408 (RSU), such as a traffic signal or sign (V2I) through a PC5 interface. In each example illustrated, two-way communication may take place between elements, therefore each element may be a transmitter and a receiver of information. In the configuration provided, the first transmission mode may be a self-managed system without assistance from a network such as a RAN. Such transmission modes may enable improved spectral efficiency, reduced cost, and increased reliability as network service interruptions do not occur during handover operations for moving vehicles. Resource assignments do not need coordination between operators and subscription to a network is not necessary, therefore there is reduced complexity for such self-managed systems. The V2X system may be configured to operate in a licensed or unlicensed spectrum, thus any vehicle with an equipped system may access a common frequency and share information. Such harmonized/common spectrum operations allows for safe operation.

Referring to FIG. 4B, a second of two complementary transmission modes is illustrated. In the illustrated embodiment, a third vehicle 410 may communicate with a fourth vehicle 412 through network communications. These network communications may occur through discrete nodes, such as a BS (e.g., an eNB or gNB), that send and receive information between vehicles. The network communications may be used, for example, for long range communications between vehicles, such as noting the presence of an accident in the distance. Other types of communication may be sent by the node to vehicles (410, 412), such as traffic flow conditions, road hazard warnings, environmental/weather reports, service station availability and other like data. Such data can be obtained from cloud-based sharing services.

Example Combining Coordination Information

In certain wireless communication systems (e.g., 5G NR systems), resource allocations for sidelink communications may be reservation based in a network scheduled mode or an autonomous mode. Under an autonomous mode, a UE may select resources from a common pool and reserve the selected resources by transmitting a reservation to one or more other UEs. In certain cases, the transmission with reservation information may reserve resources in the current slot (or other suitable time period), in which the transmission is received, and up to a certain number of slots (or other suitable time periods) in the future (e.g., two slots in the future). Reservation information may be carried in sidelink control information (SCI), for example. The resource reservations may be periodic or aperiodic. In certain cases, the period can be signaled in SCI with configurable values between 0 milliseconds (ms) and 1000 ms. Periodic resource reservation and signaling may be disabled by a configuration or preconfigured as disabled.

Under the autonomous mode for sidelink communications, a UE may perform resource selection by identifying candidate resources in a pool of resources and selecting one or more of the candidate resources for sidelink communications with one or more other UEs. The UE may identify candidate resources by monitoring resources in the pool of resources and excluding certain resources based on various properties associated with the resources, such as reference signal received power (RSRP) measurements. In certain cases, a reserved resource may be pre-empted by a higher priority reservation made by another UE. A selected, but not yet reserved, resource may be reserved by another UE, and in such a case, the resource selection procedure may be triggered again.

Figure 5:
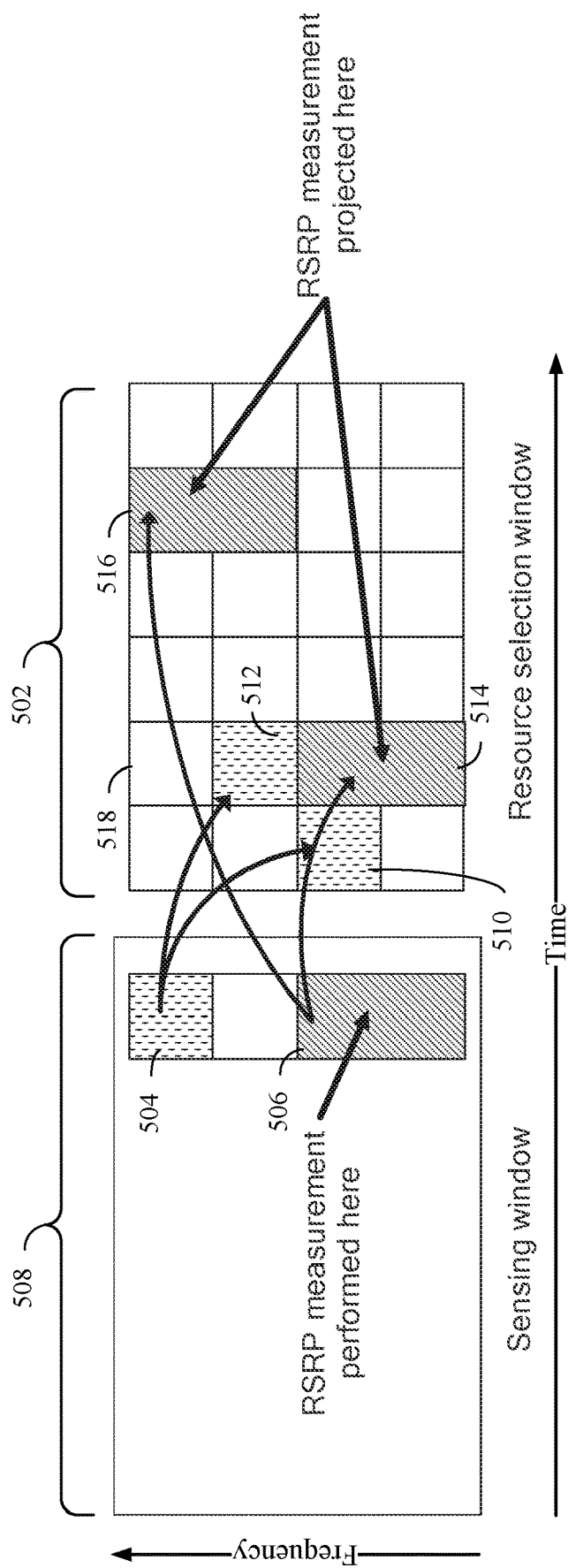
FIG. 5 illustrates a diagram of an example sensing window and resource selection window, in accordance with certain aspects of the present disclosure.

FIG. 5 illustrates a diagram of an example resource sensing window and an example resource selection window, in accordance with certain aspects of the present disclosure. A UE may determine whether candidate resources within the resource selection window 502 are available by decoding sidelink transmissions (e.g., the first and second transmissions 504, 506) and measuring various properties associated with the transmissions within the sensing window 508. The candidate resources may include the frequency-time resources in the resource selection window 502. In aspects, the transmissions 504, 506 may carry SCI with one or more reservations within the resource selection window 502. For example, the first transmission 504 may have SCI that reserves resources 510, 512 in the resource selection window 502, and the second transmission 506 may have SCI that reserves resources 514, 516 in the resource selection window 502. In certain aspects, the resource reservations in the transmission 504, 506 may have a priority indicated in that SCI that is also tracked as part of sensing and/or resource selection.

After the sensing window 508, the resource selection procedure may be triggered at the UE, for example, due to sidelink traffic being generated at the UE. The UE may select resources from the resource selection window 502 based at least in part on the measurements taken of the transmissions 504, 506 in the sensing window 508. For example, the RSRPs of the transmissions 504, 506 may be projected onto the reserved resources 510, 512, 514, 516 in the resource selection window 502. That is, the RSRP measurement for the first transmission 504 may be projected onto the reserved resources 510, 512, and the RSRP measurements for the second transmission may be projected on the reserved resources 514, 516. The resources in the resource selection window 502 with an RSRP less than or equal to a certain threshold may be considered available for sidelink communications. Other resources, such as the candidate resource 518, without any projected RSRP measurements may also be considered available for sidelink communications. In other words, the resources in the resource selection window 502 with a relatively low level of interference or no interference from other UEs may be considered available for sidelink communications. In aspects, the RSRPs may be for various sidelink reference signals, such as reference signals (e.g., demodulation reference signals) associated with the control and/or data portions of sidelink transmissions.

In certain cases, a priority associated with the resources in the resource selection window may also determine whether a resource is available. In aspects, the priority associated with a resource may have a separately configurable RSRP threshold used to compare with RSRP measurements. In certain aspects, the priority may be a priority pair having a transmit priority and receive priority, and each priority pair may have a separately configurable RSRP threshold used to compare with RSRP measurements. For example, suppose the resources 510, 512 are associated with a certain priority as indicated in the SCI within the first transmission 504, such that the priority is associated with a certain RSRP threshold. The UE may determine whether the resources 510, 512 are available based on the RSRP threshold associated with the priority.

In certain cases, a UE may receive coordination information associated with candidate resources from one or more other UEs. The coordination information may enable a UE to select resources for transmissions to avoid resource collisions. In certain cases, a UE may perform resource selections based solely on coordination information without any measurements taken during a sensing window. In such a case, the coordination information based resource selection may enable the UE to eliminate the power consumption due to monitoring resources in the sensing window.

Figure 6:
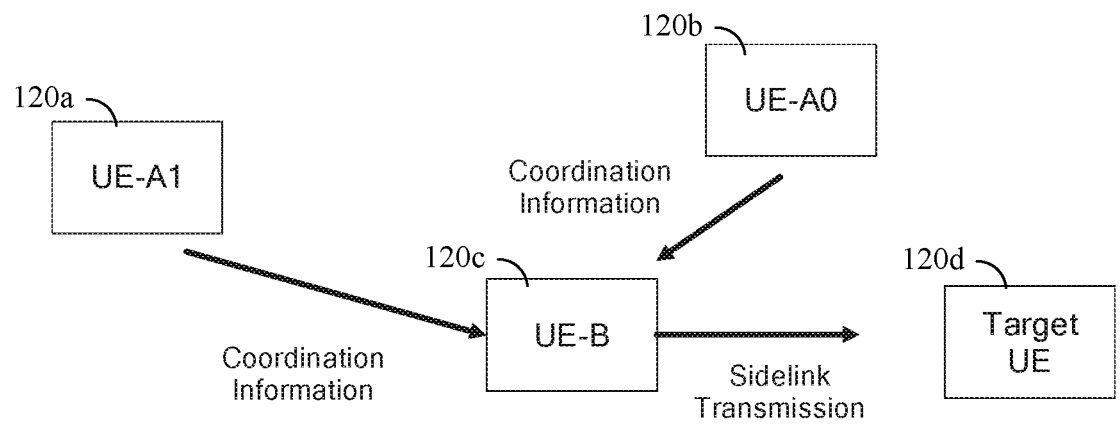
FIG. 6 illustrates an example of various sidelink transmissions where a UE receives coordination information, in accordance with certain aspects of the present disclosure.

FIG. 6 illustrates an example of various sidelink transmissions where a UE receives coordination information from multiple UEs, in accordance with certain aspects of the present disclosure. The first and second UEs 120a, 120b may generate coordination information reports (e.g., RSRP measurements, transmission priorities, slot, and/or location information corresponding to detected reservations) from monitoring resources in a sensing window (e.g., the sensing window 508). The first and second UEs 120a, 120b may share the coordination information reports with one or more other UEs (e.g., the third UE 120c). As used herein, a coordination information report may be a report that includes or indicates information associated with candidate resources and/or information associated with the UE generating the report. The third UE 120c may determine one or more available resources from a resource selection window for communicating with the target UE 120d based on the coordination information reports received from the first and second UEs 120a, 120b. The third UE 120c may communicate with the target UE 120d via the determined resources. For example, the third UE 120c may transmit various signals to the target UE 120d via the determined resources.

In aspects, the coordination information may include various information associated with candidate resources and/or various information associated with the UE that generated the coordination information. The coordination information may include an indication of which resources are available, an indication of which resources are not available, a set of resources to use for communications, a set of resources to avoid using for communications, an indication of colliding reservations, or a combination thereof. Additionally, or alternatively, the coordination information may include RSRP measurements, transmission priorities, slot, and/or location information corresponding to detected reservations. In certain aspects, the coordination information may further include location of the UE that generated the coordination information, a priority associated with the coordination information (e.g., the priority signaled in the SCI for reservations), a time indication of when the coordination information was generated, or a combination thereof.

Certain aspects of the present disclosure provide various techniques for combining coordination information from different sidelink sources (e.g., wireless communication devices such as UEs, RSUs, or vehicles) and/or combining coordination information with sensing information measured at a UE. The techniques for combining coordination information described herein may facilitate a UE to avoid resource collisions with other UEs and/or provide a desirable power consumption level, in cases, where the UE relies solely on coordination information from other UEs for resource selection. In aspects, the techniques for combining coordination information described herein may enable the UE to have desirable sidelink performance (e.g., access times, latency, data rates, packet error rates, etc.) with the target UE(s).

In certain cases, a UE may assign a rank or order to the coordination information reports received from other UEs, and the UE may determine the resources available for sidelink communications based on the ranks of the coordination information reports. The ranks may enable a UE to determine which coordination information report is suitable for resource selection. That is, the UE may filter out certain coordination information reports based on the ranks.

For example, the UE may assign ranks to the coordination information reports based on the distance between the UE that received the coordination information and the UE that generated the coordination information report. Referring to FIG. 6, the third UE 120c may select the coordination information report from the UE (the UEs 120a, 120b) which is closest to the third UE 120c for determining available resources under the assumption that the closest UE providing coordination information may be under similar channel conditions with respect to the target UE as the UE receiving the coordination information. Suppose the second UE 120b is closer to the third UE 120c than the first UE 120a. The third UE 120c may assign the coordination information from the second UE 120b with the highest rank and select that coordination information for determining available resources for communicating with the target UE 120d.

In aspects, the UE may select the coordination information reports according to the rank for determining which coordination information is suitable for resource selection. In certain cases, the UE may select the coordination information report with the highest rank for the resource selection procedure. In certain cases, the UE may select a subset of the ranked coordination information reports for the resource selection procedure. For example, the UE may select all the coordination information reports with the highest rank if there are multiple coordination information reports with the highest rank. In aspects, the UE may select a certain number of ranked coordination information reports, such as the top three or top five coordination reports. In certain cases, the UE may select all the coordination information reports for resource selection.

In aspects, if multiple coordination information reports are selected, a union or combination of the coordination information may be used for resource selection. In certain aspects, some of the coordination information may be discarded from the selected coordination information reports if a value or a combination of values is below a certain threshold. In aspects, the UE may use coordination information and sensing information for resource selection.

Figure 7:
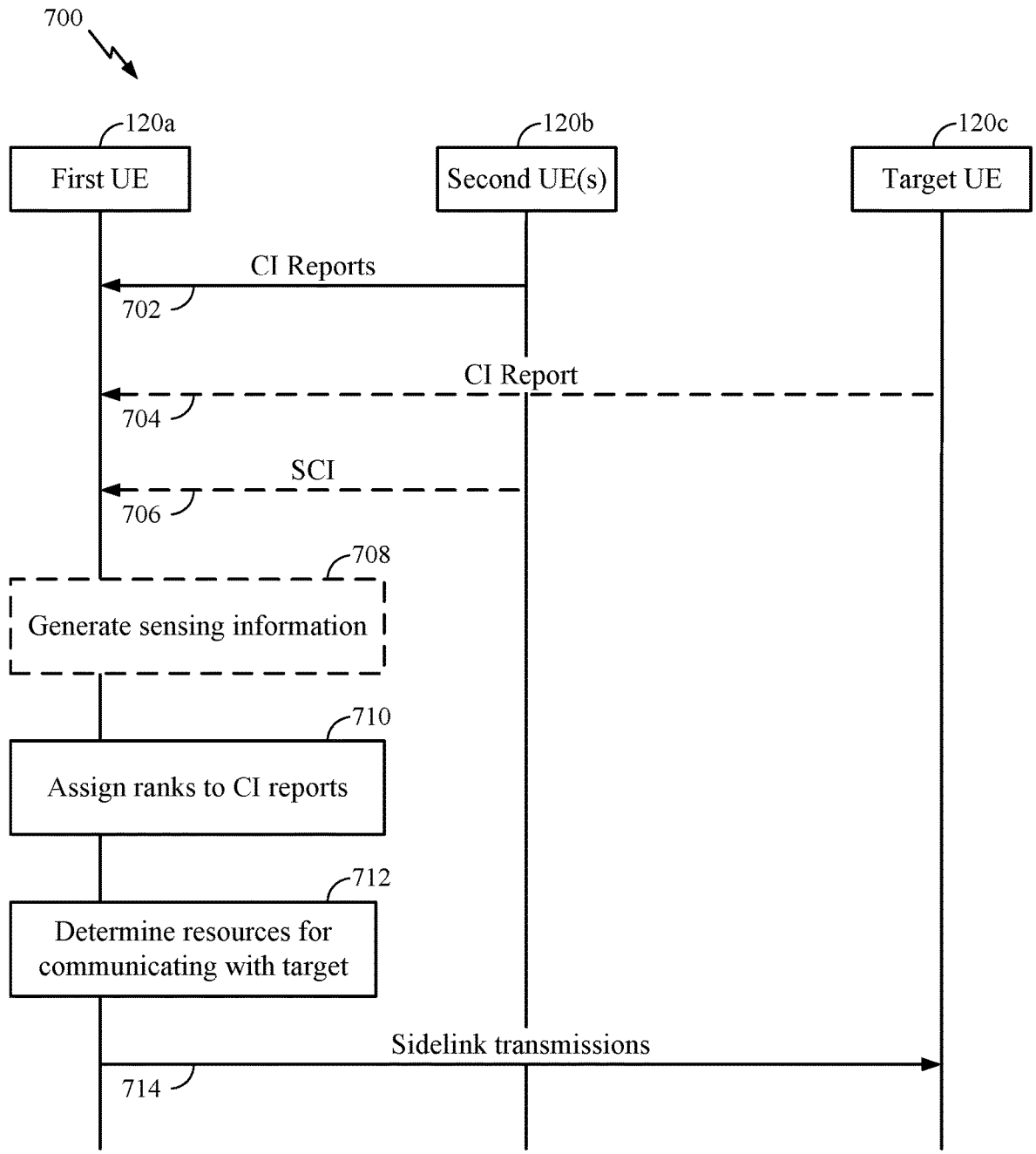
FIG. 7 is a signaling flow illustrating example signaling for combining coordination information, in accordance with certain aspects of the present disclosure.

FIG. 7 illustrates a signaling flow of example signaling 700 for combining coordination information, in accordance with certain aspects of the present disclosure. As shown, at 702, a first UE 120a receives coordination information report(s) from one or more second UEs 120b. In certain cases, at 704, the first UE 120a may receive a coordination information report from the target UE 120c. At 706, the first UE 120a may monitor resources within a sensing window and receive resource reservations via SCI from the second UEs 120b, for example, as described herein with respect to FIG. 5. At 708, the first UE 120a may generate sensing information associated with the candidate resources, such as projecting RSRPs of the transmissions received at 706 to candidate resources within a resource selection window. At 710, the first UE 120a may assign ranks to the coordination information reports received at 702 and/or at 704. At 712, the first UE 120a may determine one or more resources from the candidate resources in the resource selection window for communicating with the third UE 120c based on multiple ranked coordination information reports or a combination of coordination information received at 702 and/or 704 and sensing information generated at 708, as further described herein. At 714, the first UE 120a may communicate with the target UE 120c via the resources determined at 712. For example, the first UE 120a may transmit packets to the target UE 120c via various sidelink channels (e.g., PSSCH).

While the example depicted in FIG. 7 is described with respect to coordination information and/or sensing information associated with a single target UE to facilitate understanding, aspects of the present disclosure may also be applied to coordination information and/or sensing information associated with multiple target UEs to facilitate groupcast (multicast) or broadcast communications with the target UEs.

Figure 8:
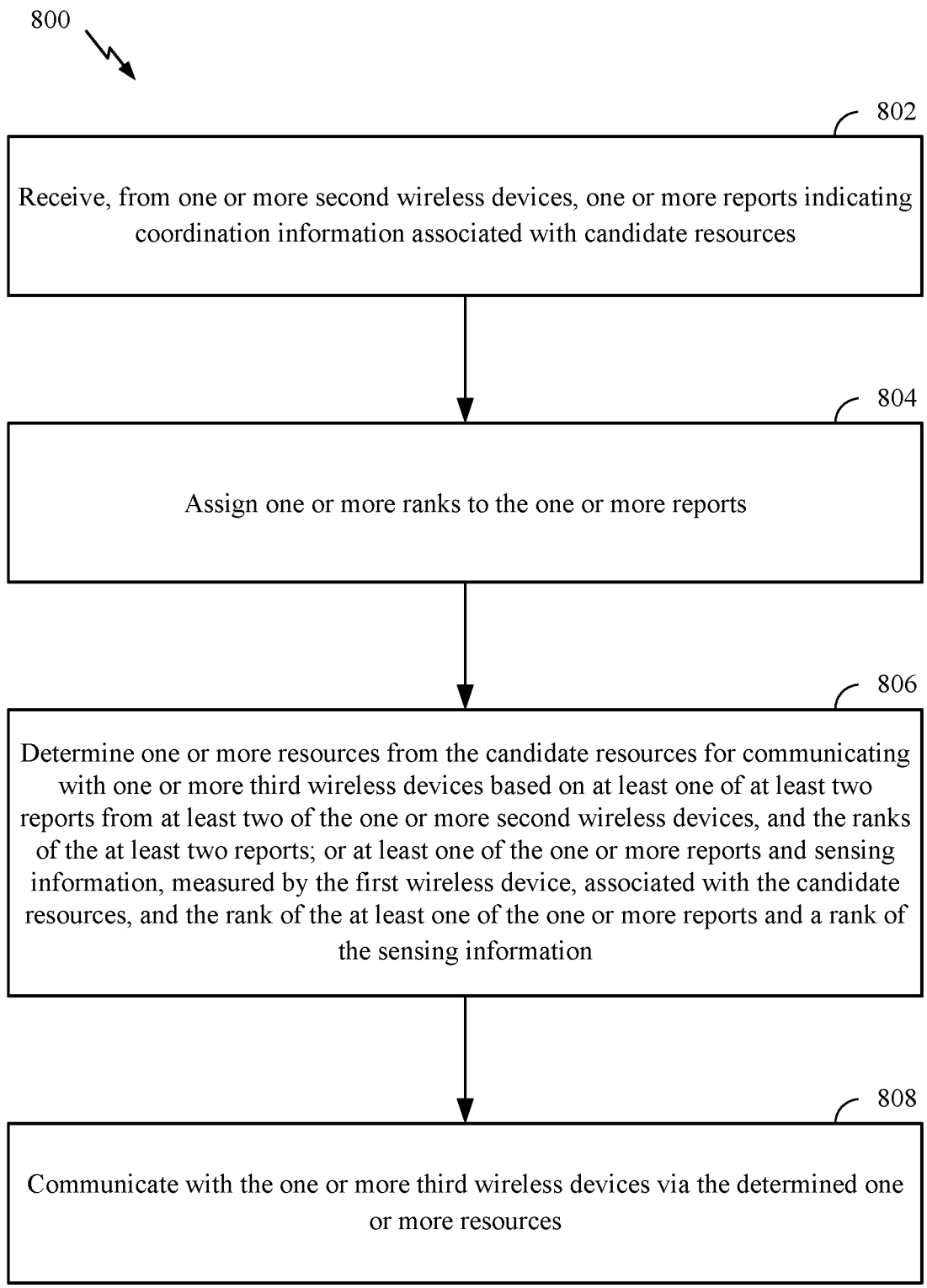
FIG. 8 is a flow diagram illustrating example operations for wireless communication by a wireless device, in accordance with certain aspects of the present disclosure.

FIG. 8 is a flow diagram illustrating example operations 800 for wireless communication, in accordance with certain aspects of the present disclosure. The operations 800 may be performed, for example, by a wireless device (e.g., the UEs 120a, 120b, 120c in the wireless communication network 100). As used herein, a wireless device may refer to a subordinate wireless communication device, such as a user equipment, wireless station, roadside unit, or the like. The operations 800 may be implemented as software components that are executed and run on one or more processors (e.g., controller/processor 280 of FIG. 2). Further, the transmission and reception of signals by the UE in operations 800 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 800 may begin at 802, where a first wireless device (e.g., the UE 120c of FIG. 6) receives, from one or more second wireless devices (e.g., the UEs 120a, 120b of FIG. 6), one or more reports indicating coordination information associated with candidate resources (e.g., the candidate resources in the resource selection window 502). At 804, the first wireless device may assign one or more ranks to the one or more reports. At 806, the first wireless device may determine one or more resources from the candidate resources for communicating with one or more third wireless devices (e.g., the target UE 120d of FIG. 6) based on at least one of: at least two reports from at least two of the one or more second wireless devices, and the ranks of the at least two reports; or at least one of the one or more reports and sensing information, measured by the first wireless device, associated with the candidate resources, and the rank of the at least one of the one or more reports and a rank of the sensing information. At 808, the first wireless device may communicate with the one or more third wireless devices via the determined one or more resources.

In aspects, determining the one or more resources at 806 may include the first wireless device performing a resource selection procedure using the coordination information and/or sensing information. In aspects, the UE may receive coordination information from one or more target UEs. For example, with respect to the operations 800, the second wireless devices may include at least one of the third wireless devices. In aspects, communicating with the one or more third wireless devices at 808 may include the first wireless device transmitting packets to the one or more third wireless devices via the determined one or more resources. For example, the first wireless device may communicate with the third wireless devices through sidelink transmissions.

In aspects, the first wireless device may assign a rank or order to the coordination information reports received from the second wireless devices. In certain cases, the ranks may be assigned to the coordination information reports based on the RSRP measured for the transmission carrying the coordination information, a location of the UE generating the coordination information, a location of the target UE for a transmission with respect to the UE generating the coordination information, a distance between the UE receiving the coordination information and the UE generating the coordination information (which may be derived from the location), a distance between the UE generating the coordination information and the target UE for a transmission (which may be derived from the location), a priority for the coordination information, a source identifier associated with the UE generating the coordination information, when the coordination information was received, or the age of coordination information (e.g., when the coordination information was generated).

For example, the one or more ranks may be assigned at 804 based on at least one of: one or more indications of channel quality between the first wireless device and the one or more second wireless devices, one or more distances between the first wireless device and the one or more second wireless devices, one or more distances between the one or more second wireless devices and the one or more third wireless devices, one or more locations of the one or more second wireless devices, one or more locations of the one or more third wireless devices, one or more signaled priorities associated with the one or more reports, one or more source identifiers of the one or more second wireless devices, one or more indications of when the one or more reports were received at the first wireless device (e.g., a timestamp or time-domain reference unit such as a slot), or one or more indications of when the one or more reports were generated at the one or more second wireless devices (e.g., a timestamp or time-domain reference unit such as a slot).

In aspects, the indications of the channel quality between the first wireless device and the one or more second wireless devices may be measured from the transmissions carrying the coordination information reports. In certain cases, the highest rank may be assigned to the coordination information report associated with a transmission with the strongest or best channel conditions (e.g., the highest RSRP) as measured by the UE receiving the coordination information. The indications of the channel quality may include a reference signal received power (RSRP), a channel quality indicator, signal-to-noise ratio (SNR), signal-to-interference plus noise ratio (SINR), signal-to-noise plus distortion ratio (SNDR), and/or a received signal strength indicator (RSSI). Referring to FIG. 6, suppose the third UE 120c measures that the transmission from the first UE 120a has a higher RSRP than the transmission from the second UE 120b. If the coordination information reports are assigned ranks according to the channel quality of the coordination information transmissions, the coordination information report from the first UE 120a may be assigned a higher rank than the rank for the coordination information report from the second UE 120b.

In aspects, the highest rank for the distances may be assigned to the coordination report associated with the smallest distance. In aspects, the distances may be derived from the locations of the target UE and/or UE generating the coordination information. Referring to FIG. 6, suppose the first UE 120a is closer to the third UE 120c than the second UE 120b, and the second UE 120b is closer to the target UE 120d than the first UE 120a. If the coordination information reports are assigned ranks according to the distance between the UE receiving the coordination information and the UE generating the coordination information, the coordination information report from the first UE 120a may be assigned a higher rank than the rank for the coordination information report from the second UE 120b. If the coordination reports are assigned ranks according to the distance between the UE generating the coordination information and the target UE for the transmission, the coordination information report from the second UE 120b may be assigned a higher rank than the rank for the coordination information report from the first UE 120a.

In aspects, the highest rank for the priority-based ranking may be assigned to the coordination information report associated with the highest priority. Referring to FIG. 6, suppose the priority of the coordination information from the first UE 120a is higher than the priority of the coordination information from the second UE 120b. If the coordination information reports are assigned ranks according to a signaled priority, the coordination information report from the first UE 120a may be assigned a higher rank than the rank for the coordination information report from the second UE 120b.

In aspects, the source identifier may indicate the type of wireless device that generated the coordination information report, and the coordination information reports may be ranked based on certain types of wireless devices. For example, the coordination information associated with a roadside unit (e.g., the RSU of FIG. 4A) may be given priority over coordination information from other types of wireless devices (such as a vehicle or mobile phone). Referring to FIG. 6, suppose the source identifier of the first UE 120a indicates that the first UE 120a is a roadside unit, and the source identifier of the second UE 120b indicates that the second UE 120b is a vehicle. In this example, the coordination information report from the first UE 120a may be assigned a higher rank than the rank for the coordination information report from the second UE 120b.

In aspects, the highest rank for the time-based ranking may be assigned to the coordination report associated with the shortest period of time, for example, as indicated by a timestamp or time-domain reference unit such as a slot. Referring to FIG. 6, suppose the third UE 120c received the coordination information report from the first UE 120a before the coordination information report from the second UE 120b, and the second UE 120b generated its coordination information before the first UE 120b. If the coordination information reports are assigned ranks according to when the coordination information was received, the coordination information report from the first UE 120a may be assigned a higher rank than the rank for the coordination information report from the second UE 120b. If the coordination information reports are assigned ranks according to when the coordination information was generated, the coordination information report from the second UE 120b may be assigned a higher rank than the rank for the coordination information report from the first UE 120a.

In aspects, the coordination information reports may be assigned ranks based on the type of transmission to the target UE. For example, the one or more ranks may be assigned at 804 based on whether the communication with the one or more third wireless devices at 808 is a unicast, a groupcast, or a broadcast communication. As an example, for a unicast transmission to the target UE, the coordination information reports may be ranked according to the distance between the UE generating the coordination information and the target UE for the transmission or the source identifier of the target UE. For groupcast or broadcast transmissions to the target UE(s), the coordination information reports may be ranked according to the distance between the UE receiving the coordination information and the UE generating the coordination information. In other words, the type of ranking (channel condition, distance, location, priority, source identifier, or time-based) may be selected based on the type of transmission to the target UE (e.g., unicast, groupcast, or broadcast).

In aspects, the coordination information reports may be assigned ranks based on the quality of service (QoS) parameters (or settings) associated with the transmission to the target UE. For example, the one or more ranks may be assigned at 802 based on one or more quality of service parameters associated with the communication with the one or more third wireless devices. As an example, suppose the QoS parameters are set for a low latency service (e.g., autonomous vehicle services or augmented reality), the coordination information reports may be ranked according to when the coordination information was generated. In other words, the type of ranking (channel condition, distance, location, source identifier, and/or time-based) may be selected based on the QoS parameters associated with the transmission to the target UE (e.g., QoS parameters for various services such as conversational voice, conversational video, video, low latency applications, or remote control).

In aspects, the UE may select the coordination information reports according to the rank for determining which coordination information is suitable for resource selection. In certain cases, the UE may select the coordination information report with the highest rank for the resource selection procedure. That is, the UE may select a single coordination information report, which has the highest rank among the other reports, for resource selection. For example, the operations 800 may include the first wireless device identifying a report having a highest rank among the reports based on the one or more ranks, and determining the one or more resources at 806 may include the first wireless device determining the one or more resources based at least in part on the report having the highest rank.

In certain cases, the UE may select a subset of the ranked coordination information reports for the resource selection procedure. For example, the operations 800 may include the first wireless device identifying a subset of the reports based on the one or more ranks, where the subset of the one or more reports may include a plurality of reports, and determining the one or more resources at 806 may include the first wireless device determining the one or more resources based at least in part on the subset of the one or more reports.

In certain cases, the UE may select all of the coordination information reports for resource selection. For example, determining the one or more resources at 806 may include the first wireless device determining the one or more resources based at least in part on all of the reports.

In aspects, if multiple coordination information reports are selected, a union or combination of the coordination information may be used for resource selection. For example, the operations 800 may include the first wireless identifying a subset of the one or more reports, for example, according to the ranks, where the subset of the one or more reports comprises a plurality of reports. The first wireless device may combine the coordination information in the subset of the one or more reports. Determining the one or more resources at 806 may include the first wireless device determining the one or more resources based at least in part on the combined coordination information.

The combined coordination information may include all of the coordination indicated in the identified reports. For example, the operations 800 may include the first wireless device combining the coordination information in the one or more reports, where the one or more reports comprises a plurality of reports. Determining the one or more resources at 806 may include the first wireless device determining the one or more resources based at least in part on the combined coordination information.

In certain aspects, some of the coordination information may be discarded from all or a subset of the coordination information reports, for example, if a value or a combination of values is equal to, greater than, or less than a certain threshold. For example, the operations 800 may include the first wireless device identifying a subset of the one or more reports, where the subset of the one or more reports comprises a plurality of reports. The first wireless device may select the coordination information in the subset of the one or more reports based on one or more threshold values. As an example, the first wireless device may select the coordination information in the subset of reports if the coordination information is equal to, less than, or greater than a certain RSRP value, certain distance, certain priority, certain source identifier, or certain time period. Determining the one or more resources at 806 may include the first wireless device determining the one or more resources based at least in part on the selected coordination information.

In aspects, some of the coordination information may be discarded from all of the coordination information reports. For example, the operations 800 may include the first wireless device selecting the coordination information in the one or more reports based on one or more threshold values, and determining the one or more resources at 806 may include the first wireless device determining the one or more resources based at least in part on the selected coordination information.

In aspects, the UE may use coordination information and sensing information for resource selection. In certain cases, the UE may prioritize coordination information over sensing information, or vice versa. The UE can choose to prioritize coordination information or sensing information based on the rankings described herein with respect to coordination information. In other words, the UE may assign a rank to the sensing information, for example, according to channel conditions, distance, priority, source identifier, and/or time, and the UE may select the coordination information and sensing information based on the ranks. For example, the operations 800 may include the first wireless device monitoring for signals from the one or more second wireless devices via the candidate resources and generating the sensing information based on the monitored signals. The first wireless device may assign the rank of the sensing information, for example, a ranking based on channel condition, distance, priority, source identifier, or time as described herein with respect to coordination information. Determining the one or more resources at 806 may include the first wireless device determining the one or more resources based at least in part on the one or more ranks assigned to the one or more reports and rank of the sensing information.

In certain cases, the UE may prioritize coordination information if the coordination information is received from a target UE when sending a unicast transmission to that UE. That is, the UE may prioritize coordination information over sensing information if that particular coordination information is received from a target UE to which the UE will be transmitting a unicast transmission at 808. With respect to the operations 800, determining the one or more resources at 806 may include the first wireless device prioritizing a report received from one of the one or more second wireless devices over the sensing information if the communicating with the one or more third wireless devices at 808 is with the one of the one or more second wireless devices via a unicast communication.

In certain aspects, the UE may prioritize coordination information based on half-duplex communications. That is, in cases where the UE misses a sensing window due to an overlapping transmission (e.g., a scheduled downlink, uplink, or sidelink transmission), the UE may supplement the missing sensing information with the coordination information. For example, the operations 800 may include the first wireless device selecting the coordination information, among the one or more reports, that supplements the sensing information due to half-duplex communications. The coordination information that supplements the sensing information due to half-duplex communication may be coordination information that completes missing sensing information due to overlapping transmissions with sensing window. Determining the one or more resources at 806 may include the first wireless device determining the one or more resources based at least in part on the selected coordination information and the sensing information.

In certain aspects, the UE may use coordination information when sensing information is missing for a given resource. The sensing information may be missing due to half-duplex communications and/or due to decoding errors at the UE. For example, the UE may not be able to successfully decode the control portion (e.g., SCI) or data portion of a resource in a sensing window, and thus, the sensing information associated with that resource may be considered missing. In certain cases, the UE may prioritize the coordination information associated with a given resource when the sensing information is missing for the given resource. As an example, the operations 800 may include the first wireless device selecting the coordination information, among the one or more reports, that is missing from the sensing information, and determining the one or more resources at 806 may include the first wireless device determining the one or more resources based at least in part on the selected coordination information and the sensing information.

In certain aspects, the UE may use coordination information when sensing information conflicts with sensing information for a given resource. A conflict between the coordination information and sensing information may occur when the sensing information for a given resource differs from the coordination information for that particular resource. For example, a conflict between the coordination information and sensing information may occur when the sensing information indicates a resource is not available and the coordination information indicates that resource is available, or vice versa. In certain cases, the UE may prioritize the coordination information over the sensing information when there is conflict between the coordination information and the sensing information. In other cases, the UE may prioritize the sensing information over the coordination information when there is conflict between the coordination information and the sensing information. As an example, the operations 800 may include the first wireless device selecting the coordination information, among the one or more reports, that conflicts with the sensing information. Determining the one or more resources at 806 may include the first wireless device determining the one or more resources based at least in part on the selected coordination information and the sensing information.

In certain aspects, the UE may apply different or separate threshold(s) in the resource selection procedure when using coordination information with respect to the thresholds used for sensing information. As an example, the UE may use a separate RSRP threshold for the RSRP measurements indicated in the coordination information than the RSRP measurements taken at the UE for the candidate resources in a resource selection window. For example, determining the one or more resources at 806 may include the first wireless device determining the one or more resources based at least in part on separate thresholds being applied to the coordination information and the sensing information.

In certain aspects, the coordination information may include various information associated with candidate resources and/or various information associated with the UE that generated the coordination information. In certain cases, at least one of the reports received at 802 may include an indication of which of the candidate resources are available, an indication of which of the candidate resources are not available, an indication of a set of resources to use for communications, an indication of a set of resource to avoid using for communications, an indication of colliding reservations, or a combination thereof. In certain aspects, at least one of the reports received at 802 may include a reference signal received power corresponding to at least one of the candidate resources, a transmission priority corresponding to the at least one of the candidate resources, a time-domain reference point (e.g., a certain slot) corresponding to the at least one of the candidate resources, location information (e.g., time-frequency domain information) corresponding to the at least one of the candidate resources, or a combination thereof. In aspects, at least one of the reports received at 802 may include a location of at least one of the second wireless devices, a priority associated with the report, an indication of when the report was generated at the at least one of the second wireless devices, or a combination thereof.

Figure 9:
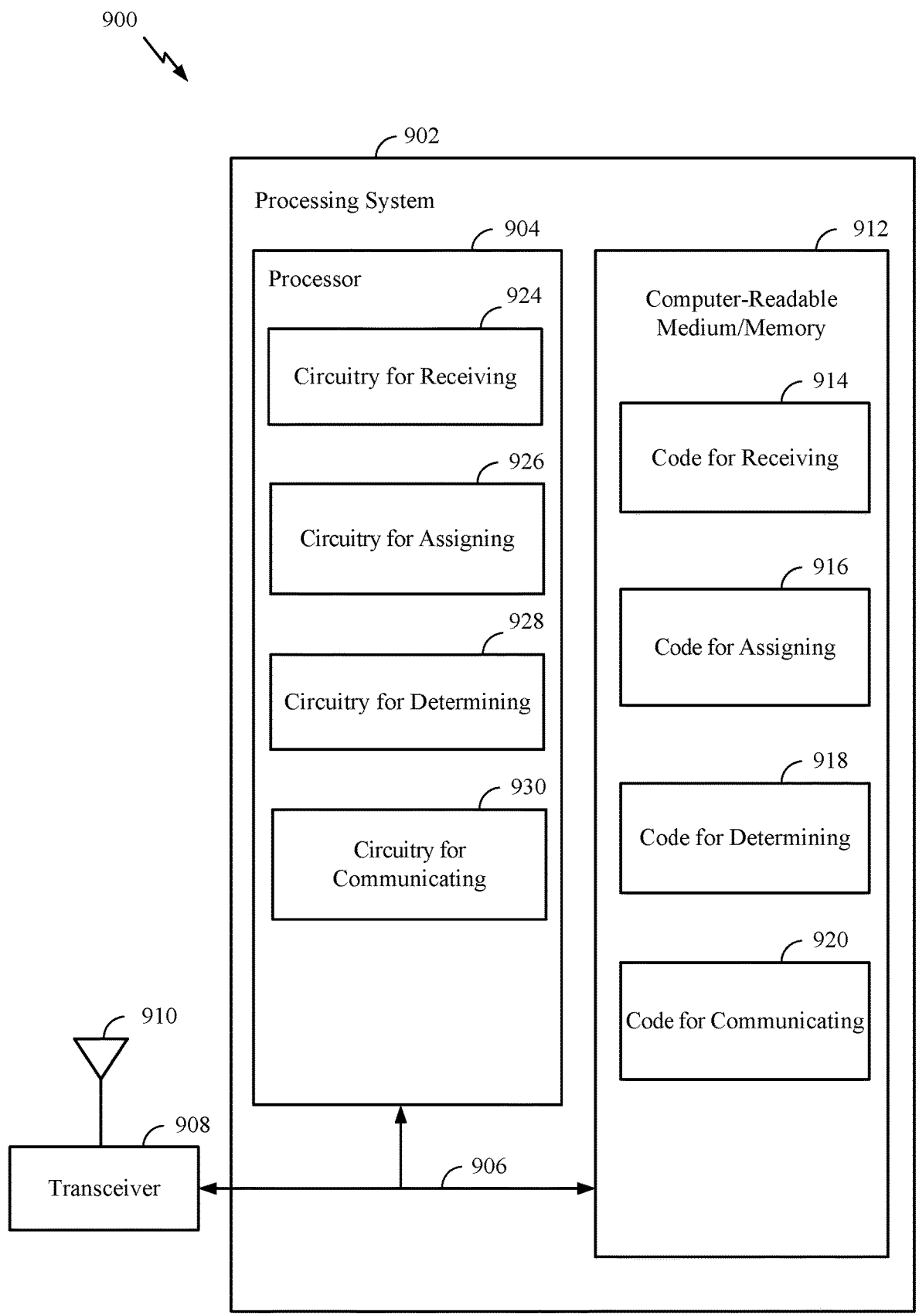
FIG. 9 illustrates a communications device that may include various components configured to perform operations for the techniques disclosed herein in accordance with aspects of the present disclosure.

FIG. 9 illustrates a communications device 900 (e.g., the UE 120*a*, an RSU, or a vehicle) that may include various components (e.g., corresponding to means-plus-function components) configured to perform operations for the techniques disclosed herein, such as the operations illustrated in FIG. 9. The communications device 900 includes a processing system 902 coupled to a transceiver 908 (e.g., a transmitter and/or a receiver). The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 904 to perform the operations illustrated in FIG. 9, or other operations for performing the various techniques discussed herein for combining coordinating information. In certain aspects, computer-readable medium/memory 912 stores code for receiving 914, code for assigning 916, code for determining 918, and/or code for communicating 920 (which may include code for receiving and/or code for transmitting). In certain aspects, the processor 904 has circuitry configured to implement the code stored in the computer-readable medium/memory 912. The processor 904 includes circuitry for receiving 924, circuitry for assigning 926, circuitry for determining 928, and/or circuitry for communicating 930 (which may include circuitry for receiving and/or circuitry for transmitting).

Example Aspects

In addition to the various aspects described above, specific combinations of aspects are within the scope of the disclosure, some of which are detailed below:

Aspect 1. A method of wireless communication by a first wireless device, comprising: receiving, from one or more second wireless devices, one or more reports indicating coordination information associated with candidate resources; assigning one or more ranks to the one or more reports; determining one or more resources from the candidate resources for communicating with one or more third wireless devices based on at least one of: at least two reports from at least two of the one or more second wireless devices, and the ranks of the at least two reports; or at least one of the one or more reports and sensing information, measured by the first wireless device, associated with the candidate resources, and the rank of the at least one of the one or more reports and a rank of the sensing information; and communicating with the one or more third wireless devices via the determined one or more resources.

Aspect 2. The method of Aspect 1, wherein the one or more ranks are assigned based on at least one of: one or more indications of channel quality between the first wireless device and the one or more second wireless devices, one or more distances between the first wireless device and the one or more second wireless devices, one or more distances between the one or more second wireless devices and the one or more third wireless devices, one or more locations of the one or more second wireless devices, one or more locations of the one or more third wireless devices, one or more signaled priorities associated with the one or more reports, one or more source identifiers of the one or more second wireless devices, one or more indications of when the one or more reports were received at the first wireless device, or one or more indications of when the one or more reports were generated at the one or more second wireless devices.

Aspect 3. The method according to any of Aspects 1 or 2, wherein the one or more ranks are assigned based on whether communication with the one or more third wireless devices is a unicast, a groupcast, or a broadcast communication.

Aspect 4. The method according to any of Aspects 1-3, wherein the one or more ranks are assigned based on one or more quality of service parameters associated with communication with the one or more third wireless devices.

Aspect 5. The method of Aspect 1, further comprising: identifying a report having a highest rank among the one or more reports based on the one or more ranks, wherein the one or more reports comprise a plurality of reports; wherein determining the one or more resources comprises determining the one or more resources based at least in part on the report having the highest rank.

Aspect 6. The method of Aspect 1, further comprising: identifying a subset of the one or more reports based on the one or more ranks, wherein the subset of the one or more reports comprises a plurality of reports; wherein determining the one or more resources comprises determining the one or more resources based at least in part on the subset of the one or more reports.

Aspect 7. The method of Aspect 1, further comprising: identifying a subset of the one or more reports, wherein the subset of the one or more reports comprises a plurality of reports; and combining the coordination information in the subset of the one or more reports; wherein determining the one or more resources comprises determining the one or more resources based at least in part on the combined coordination information.

Aspect 8. The method of Aspect 1, further comprising: combining the coordination information in the one or more reports, wherein the one or more reports comprises a plurality of reports; wherein determining the one or more resources comprises determining the one or more resources based at least in part on the combined coordination information.

Aspect 9. The method of Aspect 1, further comprising: identifying a subset of the one or more reports, wherein the subset of the one or more reports comprises a plurality of reports; and selecting the coordination information in the subset of the one or more reports based on one or more threshold values; wherein determining the one or more resources comprises determining the one or more resources based at least in part on the selected coordination information.

Aspect 10. The method of Aspect 1, further comprising: selecting the coordination information in the one or more reports based on one or more threshold values; wherein determining the one or more resources comprises determining the one or more resources based at least in part on the selected coordination information.

Aspect 11. The method of Aspect 1, further comprising: monitoring for signals from the one or more second wireless devices via the candidate resources; generating the sensing information based on the monitored signals; assigning the rank of the sensing information; and wherein determining the one or more resources comprises determining the one or more resources based at least in part on the one or more ranks assigned to the one or more reports and rank of the sensing information.

Aspect 12. The method of Aspect 1, wherein determining the one or more resources comprises: prioritizing a report received from one of the one or more second wireless devices over the sensing information based on the communicating with the one or more third wireless devices comprising communicating with the one of the one or more second wireless devices using a unicast communication.

Aspect 13. The method of Aspect 1, further comprising: selecting the coordination information, among the one or more reports, that supplements the sensing information due to half-duplex communications; wherein determining the one or more resources comprises determining the one or more resources based at least in part on the selected coordination information and the sensing information.

Aspect 14. The method of Aspect 1, further comprising: selecting the coordination information, among the one or more reports, that is missing from the sensing information or conflicts with the sensing information; wherein determining the one or more resources comprises determining the one or more resources based at least in part on the selected coordination information and the sensing information.

Aspect 15. The method of Aspect 1, wherein: determining the one or more resources comprises determining the one or more resources based at least in part on separate thresholds being applied to the coordination information and the sensing information.

Aspect 16. The method according to any of the preceding Aspects, wherein at least one of the reports includes: an indication of which of the candidate resources are available, an indication of which of the candidate resources are not available, an indication of a set of resources to use for communications, an indication of a set of resource to avoid using for communications, an indication of colliding reservations, or a combination thereof.

Aspect 17. The method according to any of Aspects 1 or 16, wherein at least one of the reports includes: a reference signal received power corresponding to at least one of the candidate resources, a transmission priority corresponding to the at least one of the candidate resources, a time-domain reference point corresponding to the at least one of the candidate resources, location information corresponding to the at least one of the candidate resources, or a combination thereof.

Aspect 18. The method according to any of Aspects 1, 17, or 18, wherein at least one of the reports includes: a location of at least one of the second wireless devices, a priority associated with the report, an indication of when the report was generated at the at least one of the second wireless devices, or a combination thereof.

Aspect 19. An apparatus for wireless communication, comprising: a transceiver configured to receive, from one or more first wireless devices, one or more reports indicating coordination information associated with candidate resources; at least on processor configured to: assig one or more ranks to the one or more reports, and determine one or more resources from the candidate resources for communicating with one or more second wireless devices based on at least one of: at least two reports from at least two of the one or more first wireless devices, and the ranks of the at least two reports; or at least one of the one or more reports and sensing information, measured by the apparatus, associated with the candidate resources, and the rank of the at least one of the one or more reports and a rank of the sensing information; and memory coupled to the at least one processor, wherein the transceiver is further configured to communicate with the one or more second wireless devices via the determined one or more resources.

Aspect 20. The apparatus of Aspect 19, wherein the apparatus is configured to perform the method of any of Aspects 1 through 18.

Aspect 21. An apparatus for wireless communication, comprising: means for receiving, from one or more first wireless devices, one or more reports indicating coordination information associated with candidate resources; means for assigning one or more ranks to the one or more reports; means for determining one or more resources from the candidate resources for communicating with one or more second wireless devices based on at least one of: at least two reports from at least two of the one or more first wireless devices, and the ranks of the at least two reports; or at least one of the one or more reports and sensing information, measured by the apparatus, associated with the candidate resources, and the rank of the at least one of the one or more reports and a rank of the sensing information; and means for communicating with the one or more second wireless devices via the determined one or more resources.

Aspect 22. The apparatus of Aspect 21, the apparatus comprising means for performing the method of any of Aspects 1 through 18.

Aspect 23. A computer readable medium having instructions stored thereon for: receiving, from one or more second wireless devices, one or more reports indicating coordination information associated with candidate resources; assigning one or more ranks to the one or more reports; determining one or more resources from the candidate resources for communicating with one or more third wireless devices based on at least one of: at least two reports from at least two of the one or more second wireless devices, and the ranks of the at least two reports; or at least one of the one or more reports and sensing information, measured by a first wireless device, associated with the candidate resources, and the rank of the at least one of the one or more reports and a rank of the sensing information; and communicating with the one or more third wireless devices via the determined one or more resources.

Aspect 24. The computer readable medium of Aspect 23, the computer readable medium having instructions stored thereon for performing the method of any of Aspects 1 through 18.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices. Some UEs may be vehicles such as cars, trucks, planes, ships, unmanned aerial vehicle, etc.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method of wireless communication by a first wireless device, comprising:
receiving, from one or more second wireless devices, one or more reports indicating coordination information associated with candidate resources;
assigning one or more ranks to the one or more reports;
determining one or more resources from the candidate resources for communicating with one or more third wireless devices based on at least one of the one or more reports and sensing information, measured by the first wireless device, associated with the candidate resources, and the rank of the at least one of the one or more reports and a rank of the sensing information, wherein the one or more resources are determined based on prioritization between the one or more reports and the sensing information by applying different thresholds for a measurement indicated in the coordination information of the one or more reports and for the sensing information measured by the first wireless device; and
communicating with the one or more third wireless devices via the determined one or more resources.

2. The method of claim 1, wherein the one or more ranks are assigned based on at least one of:
one or more indications of channel quality between the first wireless device and the one or more second wireless devices,
one or more distances between the first wireless device and the one or more second wireless devices,
one or more distances between the one or more second wireless devices and the one or more third wireless devices,
one or more locations of the one or more second wireless devices,
one or more locations of the one or more third wireless devices,
one or more signaled priorities associated with the one or more reports,
one or more source identifiers of the one or more second wireless devices,
one or more indications of when the one or more reports were received at the first wireless device, or
one or more indications of when the one or more reports were generated at the one or more second wireless devices.

3. The method of claim 1, wherein the one or more ranks are assigned based on whether communication with the one or more third wireless devices is a unicast, a groupcast, or a broadcast communication.

4. The method of claim 1, wherein the one or more ranks are assigned based on one or more quality of service parameters associated with communication with the one or more third wireless devices.

5. The method of claim 1, further comprising:
identifying a report having a highest rank among the one or more reports based on the one or more ranks, wherein the one or more reports comprise a plurality of reports;
wherein determining the one or more resources comprises determining the one or more resources based at least in part on the report having the highest rank.

6. The method of claim 1, further comprising:
identifying a subset of the one or more reports based on the one or more ranks, wherein the subset of the one or more reports comprises a plurality of reports;
wherein determining the one or more resources comprises determining the one or more resources based at least in part on the subset of the one or more reports.

7. The method of claim 1, further comprising:
combining the coordination information in the one or more reports, wherein the one or more reports comprises a plurality of reports;
wherein determining the one or more resources comprises determining the one or more resources based at least in part on the combined coordination information.

8. The method of claim 1, further comprising:
identifying a subset of the one or more reports, wherein the subset of the one or more reports comprises a plurality of reports; and
selecting the coordination information in the subset of the one or more reports based on one or more threshold values;
wherein determining the one or more resources comprises determining the one or more resources based at least in part on the selected coordination information.

9. The method of claim 1, further comprising:
selecting the coordination information in the one or more reports based on one or more threshold values;
wherein determining the one or more resources comprises determining the one or more resources based at least in part on the selected coordination information.

10. The method of claim 1, further comprising:
monitoring for signals from the one or more second wireless devices via the candidate resources;
generating the sensing information based on the monitored signals; and
assigning the rank of the sensing information.

11. The method of claim 1, wherein determining the one or more resources comprises:
prioritizing a report received from one of the one or more second wireless devices over the sensing information based on the communicating with the one or more third wireless devices including a unicast communication to the one of the one or more second wireless.

12. The method of claim 1, further comprising:
selecting the coordination information, among the one or more reports, that supplements the sensing information due to half-duplex communications;
wherein determining the one or more resources comprises determining the one or more resources based at least in part on the selected coordination information and the sensing information.

13. The method of claim 1, further comprising:
selecting the coordination information, among the one or more reports, that is missing from the sensing information or conflicts with the sensing information;
wherein determining the one or more resources comprises determining the one or more resources based at least in part on the selected coordination information and the sensing information.

14. An apparatus for wireless communication, comprising:
a transceiver configured to receive, from one or more first wireless devices, one or more reports indicating coordination information associated with candidate resources;
a memory;
one or more processors coupled to the memory, the one or more processors, individually or collectively, being configured to cause the apparatus to:
assign one or more ranks to the one or more reports, and
determine one or more resources from the candidate resources for communicating with one or more second wireless devices based on at least one of the one or more reports and sensing information, measured by the apparatus, associated with the candidate resources, and the rank of the at least one of the one or more reports and a rank of the sensing information, wherein the one or more processors are configured to cause the apparatus to determine the one or more resources based on prioritization between the one or more reports and the sensing information by applying different thresholds for a measurement indicated in the coordination information of the one or more reports and for the sensing information measured by the apparatus, wherein the transceiver is further configured to communicate with the one or more second wireless devices via the determined one or more resources.

15. The apparatus of claim 14, wherein the one or more ranks are assigned based on at least one of:
one or more indications of channel quality between the apparatus and the one or more first wireless devices,
one or more indications of when the one or more reports were received at the apparatus, or
one or more indications of when the one or more reports were generated at the one or more first wireless devices.

16. The apparatus of claim 14, wherein the one or more ranks are assigned based on at least one of:
one or more distances between the apparatus and the one or more second wireless devices,
one or more distances between the one or more second wireless devices and the one or more first wireless devices,
one or more locations of the one or more first wireless devices,
one or more locations of the one or more second wireless devices,
one or more signaled priorities associated with the one or more reports, or
one or more source identifiers of the one or more first wireless devices.

17. The apparatus of claim 14, wherein the one or more ranks are assigned based on whether communication with the one or more second wireless devices is a unicast, a groupcast, or a broadcast communication.

18. The apparatus of claim 14, wherein the one or more ranks are assigned based on one or more quality of service parameters associated with communication with the one or more second devices.

19. The apparatus of claim 14, wherein the one or more processors are further configured to cause the apparatus to:
identify a report having a highest rank among the one or more reports based on the one or more ranks, wherein the one or more reports comprise a plurality of reports; and determine the one or more resources based at least in part on the report having the highest rank.

20. The apparatus of claim 14, wherein the one or more processors are further configured to cause the apparatus to:
identify a subset of the one or more reports based on the one or more ranks, wherein the subset of the one or more reports comprises a plurality of reports; and
determine the one or more resources based at least in part on the subset of the one or more reports.

21. The apparatus of claim 14, wherein the one or more processors are further configured to cause the apparatus to:
identify a subset of the one or more reports, wherein the subset of the one or more reports comprises a plurality of reports;
combine the coordination information in the subset of the one or more reports; and
determine the one or more resources based at least in part on the combined coordination information.

22. The apparatus of claim 14, wherein the one or more processors are further configured to cause the apparatus to:
combine the coordination information in the one or more reports, wherein the one or more reports comprises a plurality of reports; and
determine the one or more resources based at least in part on the combined coordination information.

23. The apparatus of claim 14, wherein the one or more processors are further configured to cause the apparatus to:
identify a subset of the one or more reports, wherein the subset of the one or more reports comprises a plurality of reports;
select the coordination information in the subset of the one or more reports based on one or more threshold values; and
determine the one or more resources based at least in part on the selected coordination information.

24. The apparatus of claim 14, where in the one or more processors are further configured to cause the apparatus to:
select the coordination information in the one or more reports based on one or more threshold values; and
determine the one or more resources based at least in part on the selected coordination information.

25. The apparatus of claim 14, wherein:
the transceiver is further configured to monitor for signals from the one or more second wireless devices via the candidate resources; and
the one or more processors are further configured to cause the apparatus to:
generate the sensing information based on the monitored signals; and
assign the rank of the sensing information.

26. The apparatus of claim 14, wherein the one or more processors are further configured to cause the apparatus to prioritize a report received from one of the one or more first wireless devices over the sensing information based on the communicating with the one or more second wireless devices including a unicast communication to the one of the one or more second wireless.

27. The apparatus of claim 14, wherein the one or more processors are further configured to cause the apparatus to:
select the coordination information, among the one or more reports, that supplements the sensing information due to half-duplex communications; and
determine the one or more resources based at least in part on the selected coordination information and the sensing information.

28. The apparatus of claim 14, wherein the one or more processors are further configured to cause the apparatus to:
select the coordination information, among the one or more reports, that is missing from the sensing information or conflicts with the sensing information; and
determine the one or more resources based at least in part on the selected coordination information and the sensing information.

29. The method of claim 1, further comprising receiving sidelink control information (SCI) indicating a resource priority associated with one of the different thresholds for the sensing information measured by the first wireless device.

* * * * *